(12) United States Patent
Ohnuki

(10) Patent No.: US 11,294,629 B2
(45) Date of Patent: Apr. 5, 2022

(54) SEMICONDUCTOR DEVICE AND CONTROL METHOD OF SEMICONDUCTOR DEVICE

(71) Applicant: FUJITSU LIMITED, Kawasaki (JP)

(72) Inventor: Yoshiteru Ohnuki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 16/413,641

(22) Filed: May 16, 2019

(65) Prior Publication Data

US 2019/0377551 A1 Dec. 12, 2019

(30) Foreign Application Priority Data

Jun. 6, 2018 (JP) .............................. JP2018-108572

(51) Int. Cl.
*G06F 7/50* (2006.01)
(52) U.S. Cl.
CPC ....................................... *G06F 7/50* (2013.01)
(58) Field of Classification Search
None
See application file for complete search history.

(56) References Cited

U.S. PATENT DOCUMENTS

| | | | | |
|---|---|---|---|---|
| 5,457,790 A | * | 10/1995 | Iwamura | ............... G06F 9/3824 711/167 |
| 2008/0177817 A1 | * | 7/2008 | Moore | ...................... G06F 7/50 708/700 |

| | | | |
|---|---|---|---|
| 2012/0254595 A1 | 10/2012 | Wu et al. | |
| 2013/0262908 A1 | 10/2013 | Gomyo | |
| 2014/0082332 A1 | 3/2014 | Okano | |

FOREIGN PATENT DOCUMENTS

| | | |
|---|---|---|
| JP | 2007-189391 A | 7/2007 |
| JP | 2013-205905 | 10/2013 |
| JP | 2014-059761 | 4/2014 |
| WO | 2011/074059 A1 | 6/2011 |

OTHER PUBLICATIONS

Japanese Office Action dated Feb. 1, 2022 for corresponding Japanese Patent Application No. 2018-108572, with English Translation, 6 pages.

\* cited by examiner

*Primary Examiner* — Emily E Larocque
(74) *Attorney, Agent, or Firm* — Fujitsu Patent Center

(57) ABSTRACT

A semiconductor device includes an arithmetic circuit executing an arithmetic operation regarding input data, and a control circuit causing the arithmetic circuit to execute an arithmetic operation regarding first data that is an arithmetic operation target of an arithmetic command when the arithmetic command is included in a supplied command sequence, and causing the arithmetic circuit to execute an arithmetic operation regarding second data different from the first data when an arithmetic command is not included in the command sequence and the command sequence is in a specific state.

11 Claims, 12 Drawing Sheets

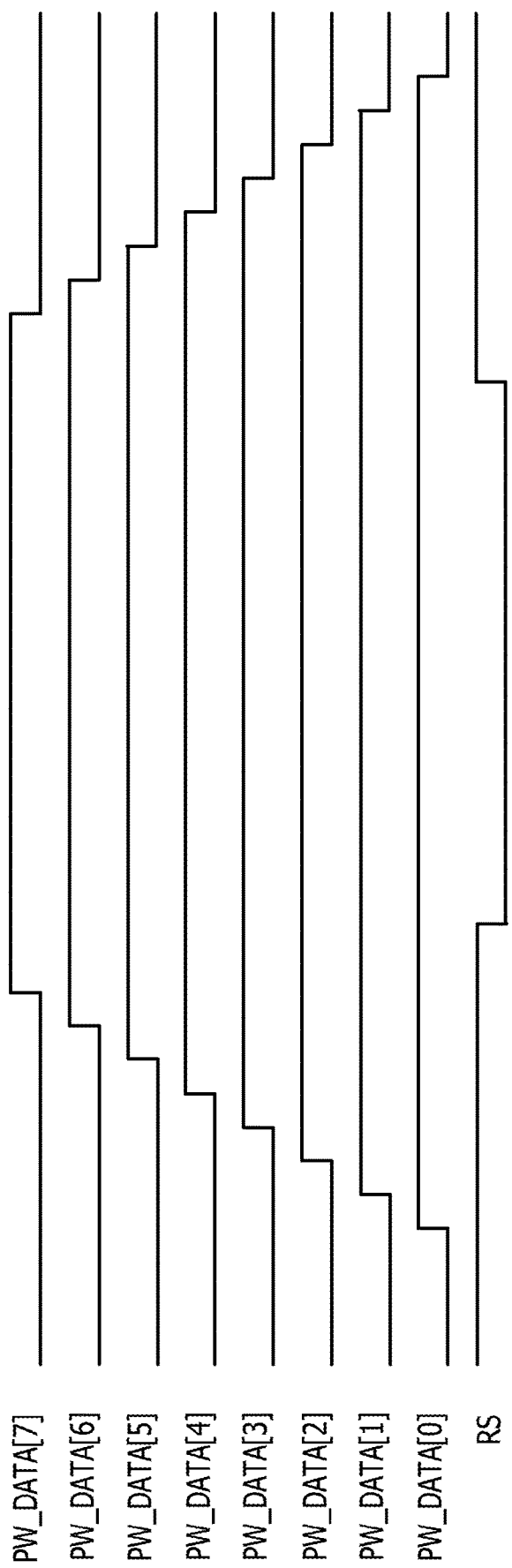

SEMICONDUCTOR DEVICE AND CONTROL METHOD OF SEMICONDUCTOR DEVICE

CROSS-REFERENCE TO RELATED APPLICATION

This application is based upon and claims the benefit of priority of the prior Japanese Patent Application No. 2018-108572, filed on Jun. 6, 2018, the entire contents of which are incorporated herein by reference.

FIELD

The embodiments discussed herein are related to a semiconductor device and a control method of a semiconductor device.

BACKGROUND

There are the following techniques as techniques for suppressing power supply noise that occurs in association with variation in the circuit current in a semiconductor device such as a processor including an arithmetic unit.

For example, there is an arithmetic processing apparatus that includes a clock generating circuit and a command executing circuit capable of a state transition between a command-executing state in which commands are executed and a command-stopped state in which commands are stopped. This arithmetic processing apparatus includes a first circuit that may inhibit application of a clock to a built-in first internal circuit when a first clock inhibition instruction is input, and a second circuit that may inhibit application of a clock to a built-in second internal circuit when a second clock inhibition instruction is input. The arithmetic processing apparatus includes a control circuit that outputs the second clock inhibition instruction to the second circuit after outputting the first clock inhibition instruction to the first circuit when the command executing circuit has made a transition from the command-executing state to the command-stopped state.

Furthermore, there is a semiconductor integrated circuit that includes a power control command control unit that receives a pre-access command corresponding to an arithmetic command to disable power saving control for circuit resources possessed by an arithmetic unit in a stepwise manner and cause part of the circuit resources of the arithmetic unit to operate, and a control unit that causes the arithmetic unit to execute arithmetic processing.

In a semiconductor device including an arithmetic unit such as a processor, the circuit current increases when the arithmetic unit executes arithmetic processing, and the circuit current decreases when the arithmetic processing is stopped. In association with such increase and decrease in the circuit current, the level of the supply voltage temporarily rises and falls. FIG. 1 is a diagram illustrating power supply noise that occurs in association with variation in a circuit current. This variation in the level of the supply voltage in association with the variation in the circuit current is referred to as power supply noise. When the level of the supply voltage deviates from the guaranteed operating voltage range due to the power supply noise, possibly malfunction of the circuit occurs.

For example, a 8-core processor that uses past technology and has the following parameters is assumed: the power is 150 W; the dynamic component that is the current component used for circuit operation in the power is 60 W; the leakage component that is the current component of the leakage current having no relation to the circuit operation is 90 W; and the operating voltage is 0.8 V. In this processor, when arithmetic units of all cores collectively make a transition from the stopped state to the running state or from the running state to the stopped state, current variation of 75 A (60 W/0.8 V) occurs.

Next, a 64-core processor that uses recent technology and has the following parameters is assumed: the power is 120 W; the dynamic component in the power is 110 W; the leakage component is 10 W; and the operating voltage is 0.7 V. In the recent technology, the transistor size becomes small and the leakage component has become smaller than the dynamic component. In this processor, when arithmetic units of all cores collectively make a transition from the stopped state to the running state or from the running state to the stopped state, current variation of 157 A (110 W/0.7 V) occurs. As above, the amount of current variation at the time of transition of the operation state is increasing along with miniaturization of the transistor size and increase in the number of cores in the processor due to advancement of technology.

As a method for suppressing the power supply noise, a method is conceivable in which disabling of a clock signal by a clock gating technique to carry out control of the clock signal for implementing power saving of a circuit is released and the circuit current is increased by a certain amount. However, it is difficult to acquire a sufficient current amount with only the amount of current increase due to the release of disabling of the clock signal in some cases, and it is difficult to suppress the power supply noise to the allowable range in some cases.

Furthermore, as another method for suppressing the power supply noise, a method in which an arithmetic circuit is controlled by using pre-access command and access end command is also conceivable. The pre-access command is a command to cause part of circuit resources to execute dummy operation to thereby disable power saving control for the circuit resources in a stepwise manner. The access end command is a command to enable power saving control for circuit resources in a stepwise manner. According to the method in which an arithmetic unit is controlled by using the pre-access command and the access end command, the magnitude of the circuit current depends on data input to the arithmetic unit at the time and it is difficult to suppress the power supply noise to the allowable range in some cases. For example, the circuit current hardly increases when the arithmetic unit repeatedly executes an arithmetic operation of 0+0=0.

The followings are reference documents.
[Document 1] Japanese Laid-open Patent Publication No. 2013-205905 and
[Document 2] Japanese Laid-open Patent Publication No. 2014-59761.

SUMMARY

According to an aspect of the embodiments, a semiconductor device includes an arithmetic circuit executing an arithmetic operation regarding input data, and a control circuit causing the arithmetic circuit to execute an arithmetic operation regarding first data that is an arithmetic operation target of an arithmetic command when the arithmetic command is included in a supplied command sequence, and causing the arithmetic circuit to execute an arithmetic operation regarding second data different from the first data when an arithmetic command is not included in the command sequence and the command sequence is in a specific state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a time chart illustrating one example of a control form of an arithmetic circuit according to a second embodiment.

DESCRIPTION OF EMBODIMENTS

One example of embodiments of the present disclosure will be described below with reference to the drawings. In the respective drawings, the same or equivalent constituent element and part are given the same reference symbol.

First Embodiment

Figure 1:
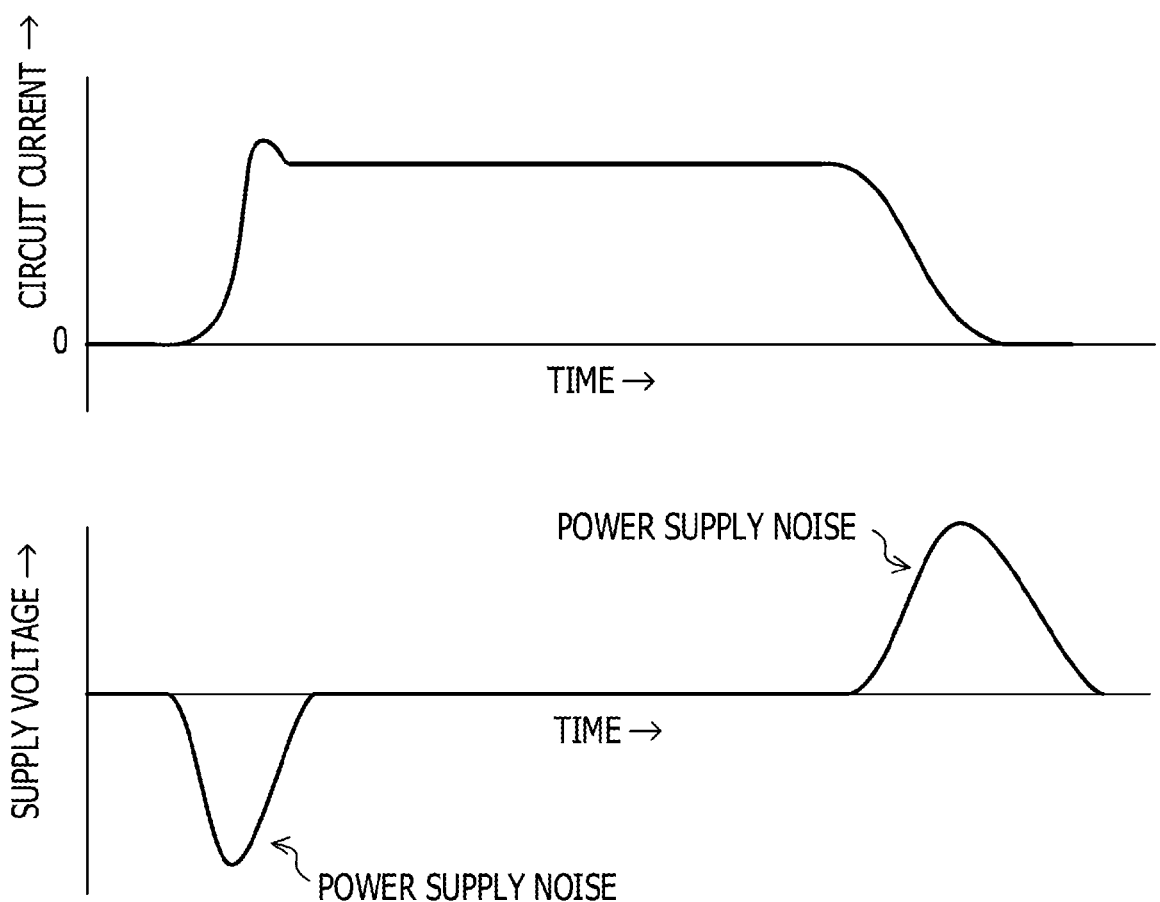
FIG. 1 is a diagram illustrating power supply noise that occurs in association with variation in a circuit current.
Figure 2:
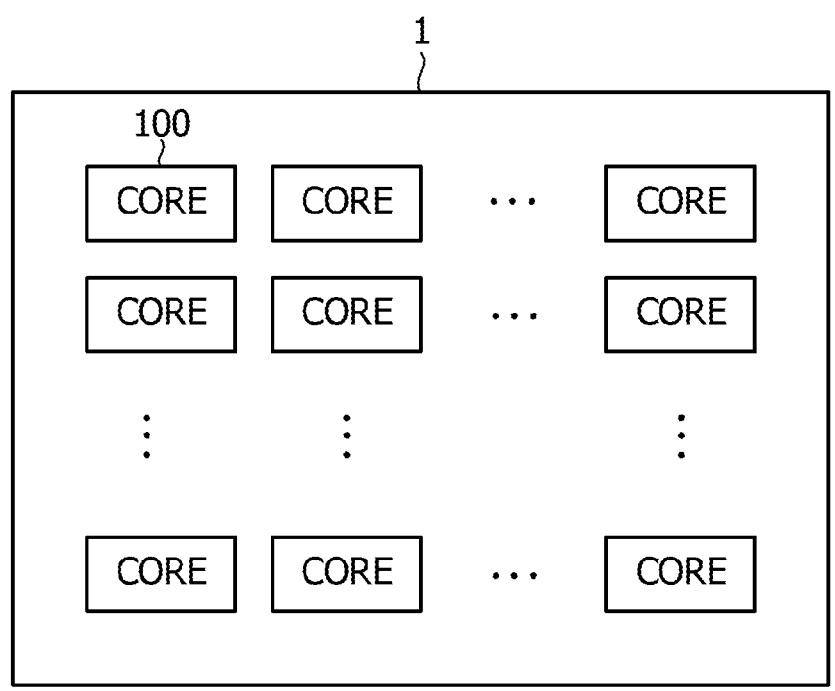
FIG. 2 is a diagram illustrating a configuration of a processor according to an embodiment.

FIG. 2 is a diagram illustrating a configuration of a processor that is one example of a semiconductor device according to an embodiment of the present disclosure. A processor 1 illustrated in FIG. 2 is configured to include plural (64, for example) cores 100 disposed in a matrix manner.

Figure 3:
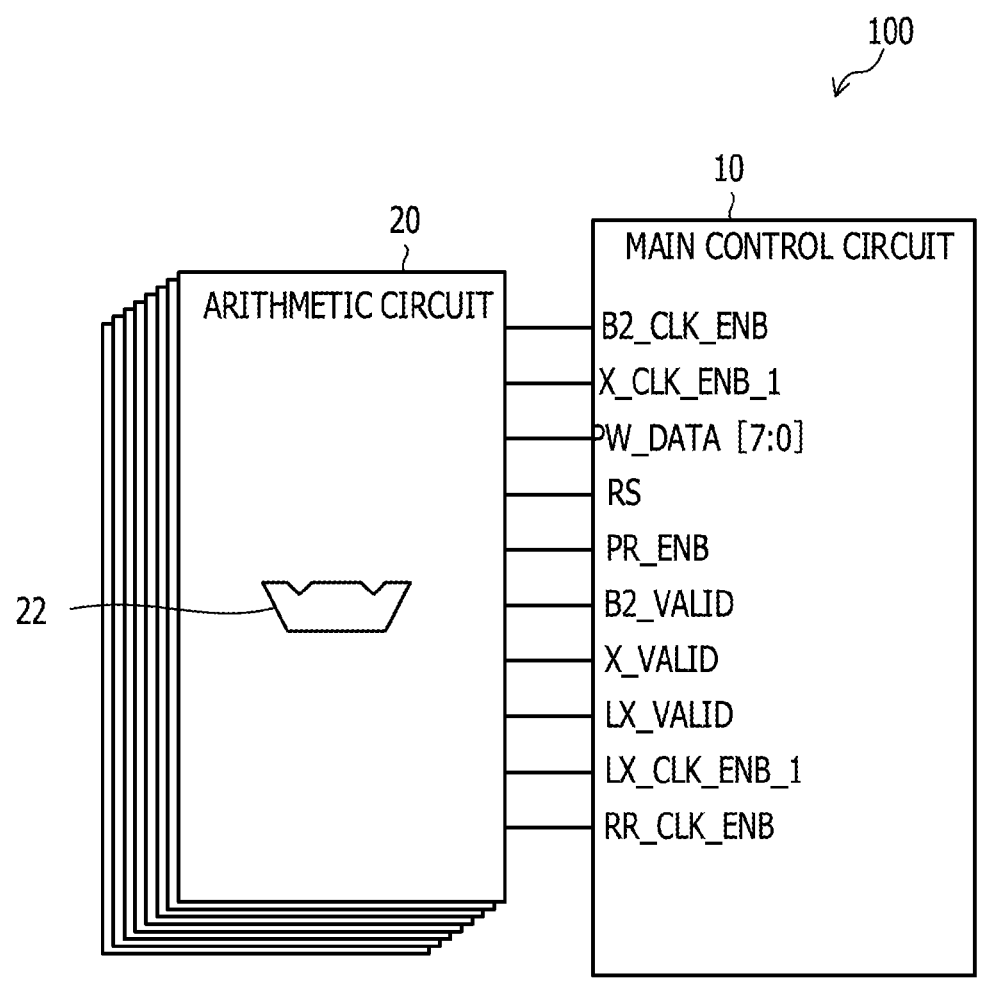
FIG. 3 is a diagram illustrating a configuration of a core according to the embodiment.

FIG. 3 is a diagram illustrating one example of a configuration of a core. The core illustrated in FIG. 3 may be one of the cores 100 illustrated in FIG. 2. Each of the cores 100 is configured to include plural (eight, for example) arithmetic circuits 20 and a main control circuit 10. Each of the arithmetic circuits 20 includes an arithmetic unit 22. The main control circuit 10 controls each of the arithmetic circuits 20 by using various control signals ([PW_DATA[7:0]], [RS], [PR_ENB], [B2_VALID], [X_VALID], [LX_VALID]) and clock enable signals ([B2_CLK_ENB], [X_CLK_ENB_1], [LX_CLK_ENB_1], [RR_CLK_ENB]).

Figure 4:
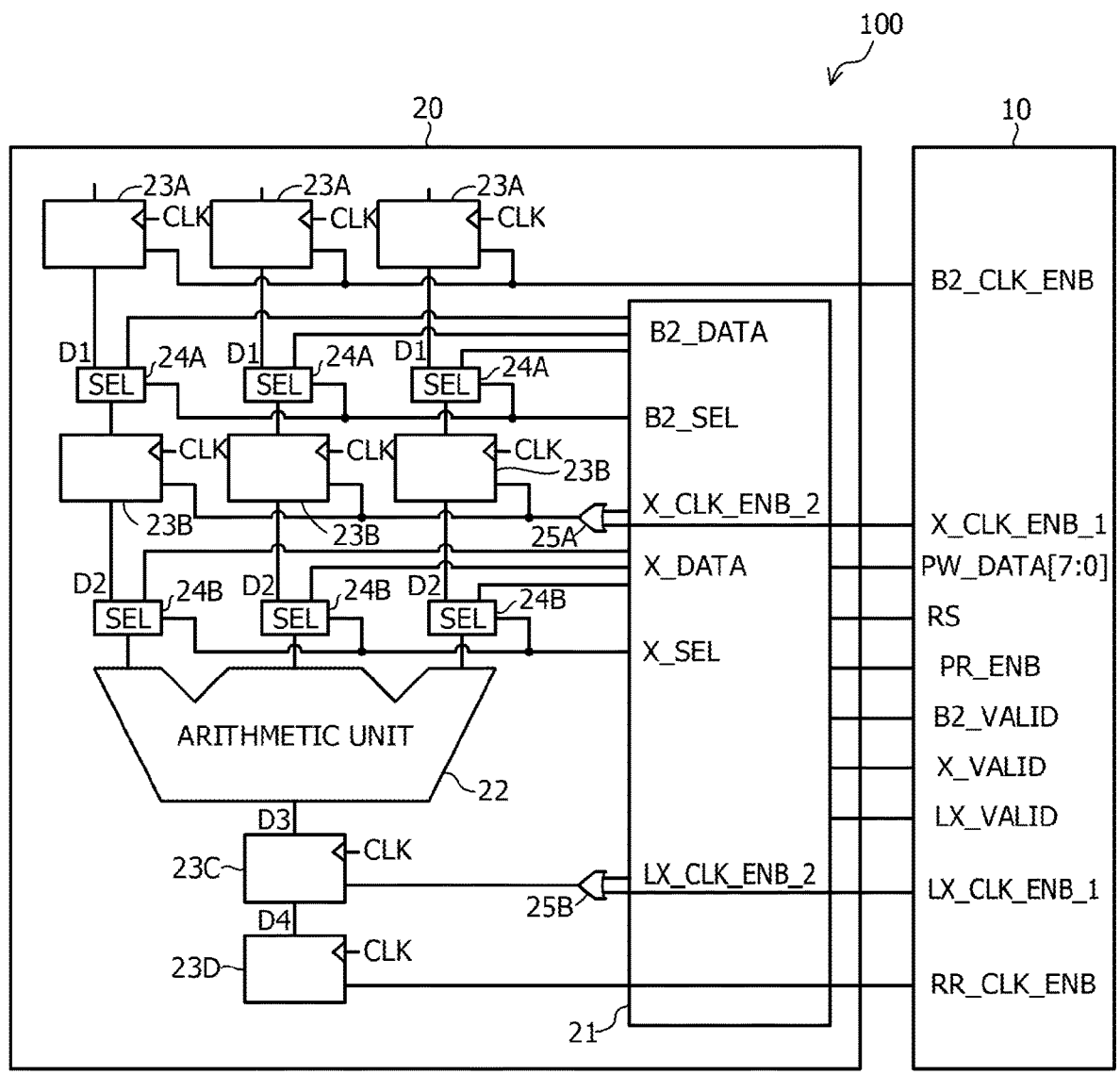
FIG. 4 is a block diagram illustrating a detailed configuration of an arithmetic circuit according to the embodiment.

FIG. 4 is a block diagram illustrating a detailed configuration of an arithmetic circuit. The arithmetic circuit illustrated in FIG. 4 may be the arithmetic circuit 20 illustrated in FIG. 3. The arithmetic circuit 20 is configured to include the arithmetic unit 22, holding circuits 23A, 23B, 23C, and 23D, selectors 24A and 24B, OR gates 25A and 25B, and a sub control circuit 21.

Each of the holding circuits 23A takes in and holds input data in synchronization with a clock signal CLK enabled according to the clock enable signal [B2_CLK_ENB] supplied from the main control circuit 10. The holding circuits 23A output the held data. Data D1 output from each of the holding circuits 23A is input to one input terminal of a respective one of the selectors 24A. Each of the holding circuits 23A may be a flip-flop, for example.

Each of the selectors 24A selects either one of the data D1 supplied from the holding circuit 23A and dummy data [B2_DATA] supplied from the sub control circuit 21 based on a selection signal [B2_SEL] supplied from the sub control circuit 21 and outputs the selected data. The data output from each of the selectors 24A is input to a respective one of the holding circuits 23B.

Each of the holding circuits 23B takes in and holds the input data in synchronization with the clock signal CLK enabled according to the clock enable signal [X_CLK_ENB_1] or [X_CLK_ENB_2]. The holding circuits 23B output the held data. Data D2 output from each of the holding circuits 23B is input to one input terminal of a respective one of the selectors 24B. Each of the holding circuits 23B may be a flip-flop, for example.

Each of the selectors 24B selects either one of the data D2 supplied from the holding circuit 23B and dummy data [X_DATA] supplied from the sub control circuit 21 based on a selection signal [X_SEL] supplied from the sub control circuit 21 and outputs the selected data. The data output from each of the selectors 24B is input to the arithmetic unit 22.

The arithmetic unit 22 executes an arithmetic operation regarding the data supplied from the selectors 24B and outputs the arithmetic result as data D3. The data D3 output from the arithmetic unit 22 is input to the holding circuit 23C.

The holding circuit 23C takes in and holds the input data in synchronization with the clock signal CLK enabled according to the clock enable signal [LX_CLK_ENB_1] or [LX_CLK_ENB_2]. The holding circuit 23C outputs the held data. Data D4 output from the holding circuit 23C is input to the holding circuit 23D. The holding circuit 23C may be a flip-flop, for example.

The holding circuit 23D takes in and holds the input data in synchronization with the clock signal CLK enabled according to the clock enable signal [RR_CLK_ENB] supplied from the main control circuit 10. The holding circuit 23D outputs the held data. The holding circuit 23D may be a flip-flop, for example.

The sub control circuit 21 outputs the pieces of dummy data [B2_DATA] and [X_DATA], the selection signals [B2_SEL] and [X_SEL], and the clock enable signals [X_CLK_ENB_2] and [LX_CLK_ENB_2] according to the various control signals ([PW_DATA[7:0]], [RS], [PR_ENB], [B2_VALID], [X_VALID], and [LX_VALID]) supplied from the main control circuit 10.

The control signal [PW_DATA[7:0]] is set to "1" when each arithmetic circuit 20 is caused to execute current raising operation, and is set to "0" when execution of the current raising operation is prohibited. The current raising operation is operation in which the arithmetic unit 22 that does not execute the original arithmetic operation based on an arithmetic command executes an arithmetic operation by using the dummy data [B2_DATA] or [X_DATA]. The arithmetic command is a command to use the arithmetic unit 22 for execution of this command.

Due to the execution of the current raising operation in the arithmetic circuit 20, the circuit current in the ground state of the arithmetic circuit 20 is raised. Due to this, in the arithmetic circuit 20, the difference between the magnitude of the circuit current in the peak state in which the circuit current is the largest and the magnitude of the circuit current in the ground state becomes smaller and the power supply noise is suppressed.

For example, the control signal [PW_DATA[7:0]] makes a transition from "0" to "1" according to a timing when the arithmetic circuit 20 makes a transition from the stopped state to the running state, and makes a transition from "1" to "0" according to a timing when the arithmetic circuit 20 makes a transition from the running state to the stopped state. The control signal [PW_DATA[7:0]] is an 8-bit signal corresponding to each of the eight arithmetic circuits 20 configuring the core 100 and each bit value is supplied to the corresponding arithmetic circuit 20.

The control signal [RS] is set to "1" when the arithmetic circuit 20 is set to the stopped state (retention state) and is set to "0" when the arithmetic circuit 20 is set to the running state.

The control signal [PR_ENB] is set to "1" if the main control circuit 10 has determined that a command sequence supplied from an upper-level system to the main control circuit 10 is in a specific state that possibly causes power supply noise. For example, if it is indicated by a command sequence that plural arithmetic circuits 20 collectively make a transition from the stopped state to the running state or from the running state to the stopped state, the main control circuit 10 determines that this command sequence is in the specific state that possibly causes power supply noise. For example, the main control circuit 10 sets the control signal [PR_ENB] to "1" when detecting, from the command sequence, that there is a possibility that the variation width of the circuit current becomes larger than a given value.

The control signal [B2_VALID] is set to "1" when the arithmetic unit 22 is activated in the B2 cycle of pipeline processing executed in the arithmetic circuit 20 based on an arithmetic command. The control signal [X_VALID] is set to "1" when the arithmetic unit 22 is activated in the X cycle of pipeline processing executed in the arithmetic circuit 20 based on an arithmetic command. The control signal [LX_VALID] is set to "1" when the arithmetic unit 22 is activated in the LX cycle of pipeline processing executed in the arithmetic circuit 20 based on an arithmetic command.

The main control circuit 10 controls execution/non-execution of the current raising operation by supplying the above-described various control signals ([PW_DATA[7:0]], [RS], [PR_ENB], [B2_VALID], [X_VALID], [LX_VALID]) to the sub control circuit 21. Table 1 illustrated below is a table that represents the relation among the various control signals and the execution/non-execution of the current raising operation. In Table 1, circle marks represent the execution of the current raising operation and cross marks represent the non-execution of the current raising operation.

TABLE 1

| PW_DATA[n] | 0 | 1 | 1 | 1 | 1 | 1 | 1 | 1 | 1 |
|---|---|---|---|---|---|---|---|---|---|
| PR_ENB | — | 0 | 0 | 0 | 0 | 1 | 1 | 1 | 1 |
| RS | — | 0 | 0 | 1 | 1 | 0 | 0 | 1 | 1 |
| *_VALID | — | 0 | 1 | 0 | 1 | 0 | 1 | 0 | 1 |
| Current raising operation | x | o | x | x | x | o | x | o | x |

When the control signal [PW_DATA[7:0]] is "0," the current raising operation is not executed in the arithmetic circuit 20 irrespective of the other control signals ([RS], [PR_ENB], [B2_VALID], [X_VALID], [LX_VALID]). For example, the current raising operation is prohibited when the control signal [PW_DATA[7:0]] is "0." When the control signal [PW_DATA[7:0]] is "1," the execution/non-execution of the current raising operation is set according to the state of the other control signals ([RS], [PR_ENB], [B2_VALID], [X_VALID], [LX_VALID]).

The clock enable signal [B2_CLK_ENB] is a signal for controlling enabling/disabling of the clock signal CLK of the holding circuits 23A in the B2 cycle of pipeline processing. The clock signal CLK is enabled through turning of the clock enable signal [B2_CLK_ENB] to "1," and the clock signal CLK is disabled through turning of the clock enable signal [B2_CLK_ENB] to "0."

The clock enable signal [X_CLK_ENB_1] is a signal for controlling enabling/disabling of the clock signal CLK of the holding circuits 23B in the X cycle of pipeline processing. The clock signal CLK is enabled through turning of the clock enable signal [X_CLK_ENB_1] to "1," and the clock signal CLK is disabled through turning of the clock enable signal [X_CLK_ENB_1] to "0."

The clock enable signal [LX_CLK_ENB_1] is a signal for controlling enabling/disabling of the clock signal CLK of the holding circuit 23C in the LX cycle of pipeline processing. The clock signal CLK is enabled through turning of the clock enable signal [LX_CLK_ENB_1] to "1," and the clock signal CLK is disabled through turning of the clock enable signal [LX_CLK_ENB_1] to "0."

The clock enable signal [RR_CLK_ENB] is a signal for controlling enabling/disabling of the clock signal CLK of the holding circuit 23D in the RR cycle of pipeline processing. The clock signal CLK is enabled through turning of the clock enable signal [RR_CLK_ENB] to "1," and the clock signal CLK is disabled through turning of the clock enable signal [RR_CLK_ENB] to "0."

The sub control circuit 21 executes the following processing in the case of executing the current raising operation based on the various control signals ([PW_DATA[7:0]], [RS], [PR_ENB], [B2_VALID], [X_VALID], [LX_VALID]) supplied from the main control circuit 10.

The sub control circuit 21 that executes the current raising operation supplies the dummy data [B2_DATA] to the selectors 24A. Furthermore, the sub control circuit 21 that executes the current raising operation supplies, to the selectors 24A, the selection signal [B2_SEL] indicating that the dummy data [B2_DATA] is to be selected in the data D1 and the dummy data [B2_DATA]. Moreover, the sub control circuit 21 that executes the current raising operation supplies the clock enable signal [X_CLK_ENB_2] that enables the clock signal CLK of the holding circuits 23B to the holding circuits 23B. In addition, the sub control circuit 21 that executes the current raising operation supplies the dummy data [X_DATA] to the selectors 24B. Furthermore, the sub control circuit 21 that executes the current raising operation supplies, to the selectors 24B, the selection signal [X_SEL] indicating that the dummy data [X_DATA] is to be selected in the data D2 and the dummy data [X_DATA]. Moreover, the sub control circuit 21 that executes the current raising operation supplies the clock enable signal [LX_CLK_ENB_2] that enables the clock signal CLK of the holding circuit 23C to the holding circuit 23C.

Through the execution of the above-described processing by the sub control circuit 21 that executes the current raising operation, the dummy data [B2_DATA] is output from the selectors 24A and the dummy data [B2_DATA] is held in the holding circuits 23B. Furthermore, the dummy data [B2_DATA] or [X_DATA] is output from the selectors 24B and is supplied to the arithmetic unit 22.

Due to the execution of the current raising operation in the arithmetic circuit 20, the arithmetic unit 22 executes an arithmetic operation regarding the dummy data [B2_DATA] or [X_DATA] and outputs the arithmetic result as the data D3. The clock signal CLK is enabled based on the clock enable signal [LX_CLK_ENB_2] and thereby the holding circuit 23C holds the data D3. The data D3 obtained by the arithmetic operation regarding the dummy data [B2_DATA] or [X_DATA] by the arithmetic unit 22 is discarded without being taken in by the holding circuit 23D.

Figure 5:
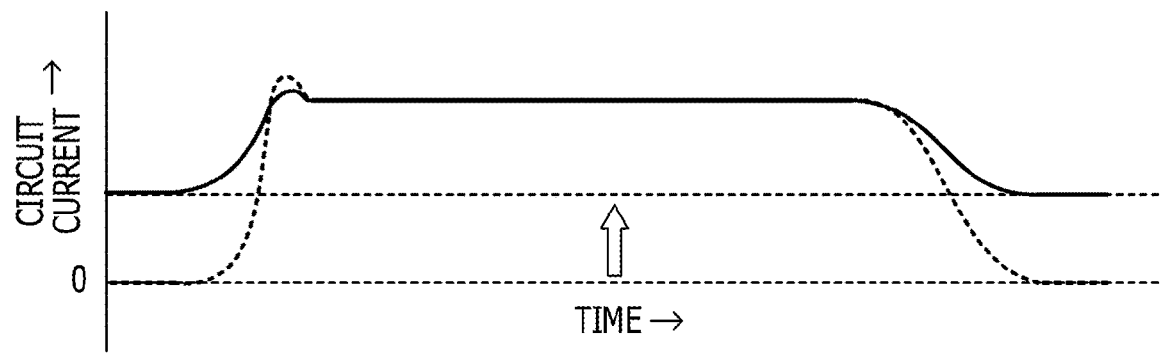
FIG. 5 is a diagram illustrating one example of an effect of current raising operation according to the embodiment.
Figure 5:
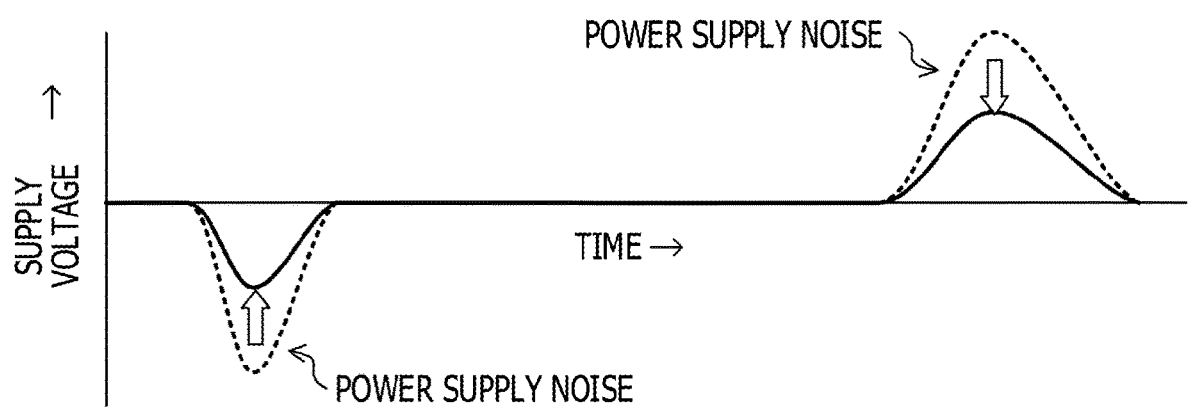

FIG. 5 is a diagram illustrating one example of an effect of current raising operation. The upper stage of FIG. 5 is a graph illustrating the time transition of the circuit current. The solid line corresponds to the case in which the current raising operation is executed and the dotted line corresponds to the case in which the current raising operation is not executed. The lower stage of FIG. 5 is a graph illustrating the time transition of the supply voltage. The solid line corresponds to the case in which the current raising operation is executed and the dotted line corresponds to the case in which the current raising operation is not executed. When the current raising operation is executed, the arithmetic unit 22 that does not execute the original arithmetic operation based on an arithmetic command executes an arithmetic operation regarding the dummy data [B2_DATA] or [X_DATA]. Due to this, as illustrated in the upper stage of FIG. 5, the circuit current in the ground state of the arithmetic circuit 20 is raised and the difference between the magnitude of the circuit current in the peak state and the magnitude of the circuit current in the ground state becomes small. As a result, the power supply noise is suppressed.

Here, for example, when the arithmetic unit 22 is caused to repeatedly execute an arithmetic operation of "0+0=0," it is difficult to expect the effect of raising the circuit current. On the other hand, it is possible to effectively raise the circuit current by causing the arithmetic unit 22 to execute an arithmetic operation through which the value of each bit of the data D3, which is the arithmetic result of the arithmetic unit 22, is inverted from "0" to "1" or from "1" to "0." The sub control circuit 21 holds plural data patterns that include a bit string corresponding to each of the input bits of the arithmetic unit 22 and are different from each other as the pieces of dummy data [B2_DATA] and [X_DATA]. The sub control circuit 21 sequentially inputs the plural data patterns configuring the pieces of dummy data to the arithmetic unit 22. The arithmetic unit 22 is thereby caused to execute an arithmetic operation through which the value of at least one bit of the data D3, which is the arithmetic result of the arithmetic unit 22, is inverted from "0" to "1" or from "1" to "0." For example, the plural data patterns configuring the pieces of dummy data [B2_DATA] and [X_DATA] are configured in such a manner that the value of at least one bit of the output bits of the arithmetic unit 22 is inverted through sequential supply of the plural data patterns to the arithmetic unit 22. This makes it possible to effectively raise the circuit current.

Furthermore, it is also possible to adjust the amount of raising of the circuit current by controlling the number of bits inverted from "0" to "1" or from "1" to "0" (hereinafter, referred to as the number of inverted bits) in the respective bits of the data D3, which is the arithmetic result of the arithmetic unit 22. For example, if the amount of raising of the circuit current when the values of all of 64 bits of the data D3 output from the 64-bit arithmetic unit 22 are inverted is defined as 100, the amount of raising of the circuit current when the values of 32 bits of the data D3 are inverted is approximately 50. In the processor 1, by appropriately selecting the combination of the data patterns sequentially input to the arithmetic unit 22 as the pieces of dummy data [B2_DATA] and [X_DATA], the number of inverted bits in the output of the arithmetic unit 22 may be controlled and the amount of raising of the circuit current may be adjusted.

Figure 6:
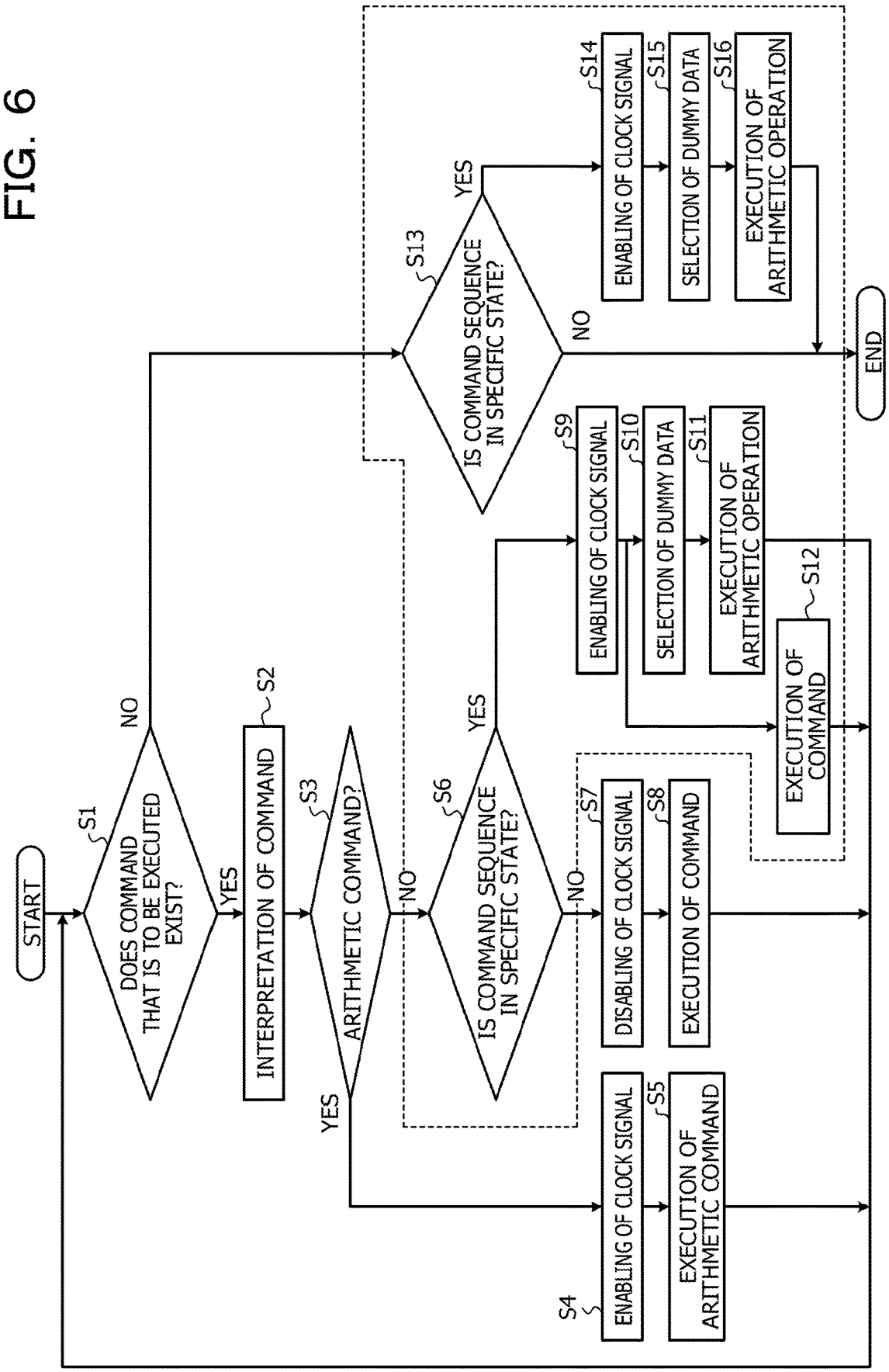
FIG. 6 is a flowchart illustrating one example of a control form of an arithmetic circuit according to the embodiment.

FIG. 6 is a flowchart illustrating one example of a control form of an arithmetic circuit according to the embodiment of the present disclosure. The arithmetic circuit described with reference to FIG. 6 may be the arithmetic circuit 20 illustrated in FIG. 3. In this example, the case in which the arithmetic circuit 20 is in the running state (control signal [PW_DATA[7:0] is "1" and the control signal [RS] is "0") is envisaged.

In a step S1, the main control circuit 10 determines whether or not a command that is to be executed exists in a command sequence supplied from an upper-level system. When determining that a command that is to be executed is included in the command sequence, the main control circuit 10 makes a transition of the processing to a step S2. When determining that a command that is to be executed is not included in the command sequence, the main control circuit 10 makes a transition of the processing to a step S13.

In the step S2, the main control circuit 10 interprets the command included in the command sequence. In a step S3, the main control circuit 10 determines whether or not the command that is to be executed is an arithmetic command. When determining that the command that is to be executed is an arithmetic command, the main control circuit 10 makes a transition of the processing to a step S4. When determining that the command that is to be executed is not an arithmetic command, the main control circuit 10 makes a transition of the processing to a step S6.

In the step S4, the main control circuit 10 sequentially enables the clock signals CLK of the holding circuits 23A, 23B, 23C, and 23D by sequentially setting the clock enable signals [B2_CLK_ENB], [X_CLK_ENB_1], [LX_CLK_ENB_1], and [RR_CLK_ENB] to "1."

In a step S5, the arithmetic unit 22 executes an arithmetic operation based on the arithmetic command. For example, the arithmetic unit 22 executes the arithmetic operation regarding data relating to the arithmetic command (data D2 supplied from the holding circuits 23B). Thereafter, the processing is returned to the step S1.

In the step S6, the main control circuit 10 determines whether or not the command sequence is in a specific state that possibly causes power supply noise. For example, if the command sequence indicates that plural arithmetic circuits 20 collectively make a transition from the stopped state to the running state or from the running state to the stopped state, the main control circuit 10 determines that this command sequence is in the specific state that possibly causes power supply noise. When determining that the command sequence is not in the specific state that possibly causes power supply noise, the main control circuit 10 makes a transition of the processing to a step S7. When determining that the command sequence is in the specific state that possibly causes power supply noise, the main control circuit 10 makes a transition of the processing to a step S9.

In the step S7, the main control circuit 10 disables the clock signals CLK of the holding circuits 23A, 23B, 23C, and 23D by setting the clock enable signals [B2_CLK_ENB], [X_CLK_ENB_1], [LX_CLK_ENB_1], and [RR_CLK_ENB] to "0."

In a step S8, the main control circuit 10 executes the command that is not an arithmetic command (load command, for example). Thereafter, the processing is returned to the step S1.

In the step S9, the main control circuit 10 sets the control signal [PR_ENB] to "1" to cause the arithmetic circuit 20 to execute the current raising operation. In response to this, the sub control circuit 21 enables the clock signals CLK of the holding circuits 23B and 23C by setting the clock enable signals [X_CLK_ENB_2] and [LX_CLK_ENB_2] to "1."

In a step S10, the sub control circuit 21 supplies the dummy data [B2_DATA] to the selectors 24A and supplies the selection signal [B2_SEL] indicating that the dummy data [B2_DATA] is to be selected to the selectors 24A. Furthermore, the sub control circuit 21 supplies the dummy data [X_DATA] to the selectors 24B and supplies the selection signal [X_SEL] indicating that the dummy data [X_DATA] is to be selected to the selectors 24B.

In a step S11, the arithmetic unit 22 executes an arithmetic operation regarding the dummy data [B2_DATA] or [X_DATA]. By causing the arithmetic unit 22 that does not execute an arithmetic operation based on an arithmetic command to execute the arithmetic operation regarding the dummy data [B2_DATA] or [X_DATA] as above, the current raising operation is implemented. Thereafter, the processing is returned to the step S1.

In a step S12, the main control circuit 10 executes the command that is not an arithmetic command concurrently with the arithmetic operation regarding the dummy data [B2_DATA] or [X_DATA] by the arithmetic unit 22. Thereafter, the processing is returned to the step S1.

If a command that is to be executed is not included in the command sequence, the main control circuit 10 determines whether or not the command sequence is in the specific state that possibly causes power supply noise in the step S13. For example, if the command sequence indicates that plural arithmetic circuits 20 collectively make a transition from the stopped state to the running state or from the running state to the stopped state, the main control circuit 10 determines that this command sequence is in the specific state that possibly causes power supply noise. When determining that the command sequence is in the specific state that possibly causes power supply noise, the main control circuit 10 makes a transition of the processing to a step S14. When determining that the command sequence is not in the specific state that possibly causes power supply noise, the main control circuit 10 ends the processing.

In the step S14, the main control circuit 10 sets the control signal [PR_ENB] to "1" to cause the arithmetic circuit 20 to execute the current raising operation. In response to this, the sub control circuit 21 enables the clock signals CLK of the holding circuits 23B and 23C by setting the clock enable signals [X_CLK_ENB_2] and [LX_CLK_ENB_2] to "1."

In a step S15, the sub control circuit 21 supplies the dummy data [B2_DATA] to the selectors 24A and supplies the selection signal [B2_SEL] indicating that the dummy data [B2_DATA] is to be selected to the selectors 24A. Furthermore, the sub control circuit 21 supplies the dummy data [X_DATA] to the selectors 24B and supplies the selection signal [X_SEL] indicating that the dummy data [X_DATA] is to be selected to the selectors 24B.

In a step S16, the arithmetic unit 22 executes an arithmetic operation regarding the dummy data [B2_DATA] or [X_DATA]. By causing the arithmetic unit 22 that does not execute an arithmetic operation based on an arithmetic command to execute the arithmetic operation regarding the dummy data [B2_DATA] or [X_DATA] as above, the current raising operation is implemented.

As described above, according to the processor 1 in accordance with the embodiment of the present disclosure, if an arithmetic command is included in a supplied command sequence, the arithmetic unit 22 executes an arithmetic operation regarding data relating to this arithmetic command (data D2 supplied from the holding circuits 23B). On the other hand, when a command that is to be executed is not included in the command sequence or when an arithmetic command is not included in the command sequence, the arithmetic unit 22 executes an arithmetic operation regarding the dummy data [B2_DATA] or [X_DATA] if the command sequence is in the specific state that possibly causes power supply noise. By the execution of the arithmetic operation regarding the dummy data [B2_DATA] or [X_DATA] by the arithmetic unit 22, the circuit current in the ground state of the arithmetic circuit 20 is raised. Due to this, the difference between the magnitude of the circuit current in the peak state and the magnitude of the circuit current in the ground state becomes small and the power supply noise is suppressed.

Figure 7:
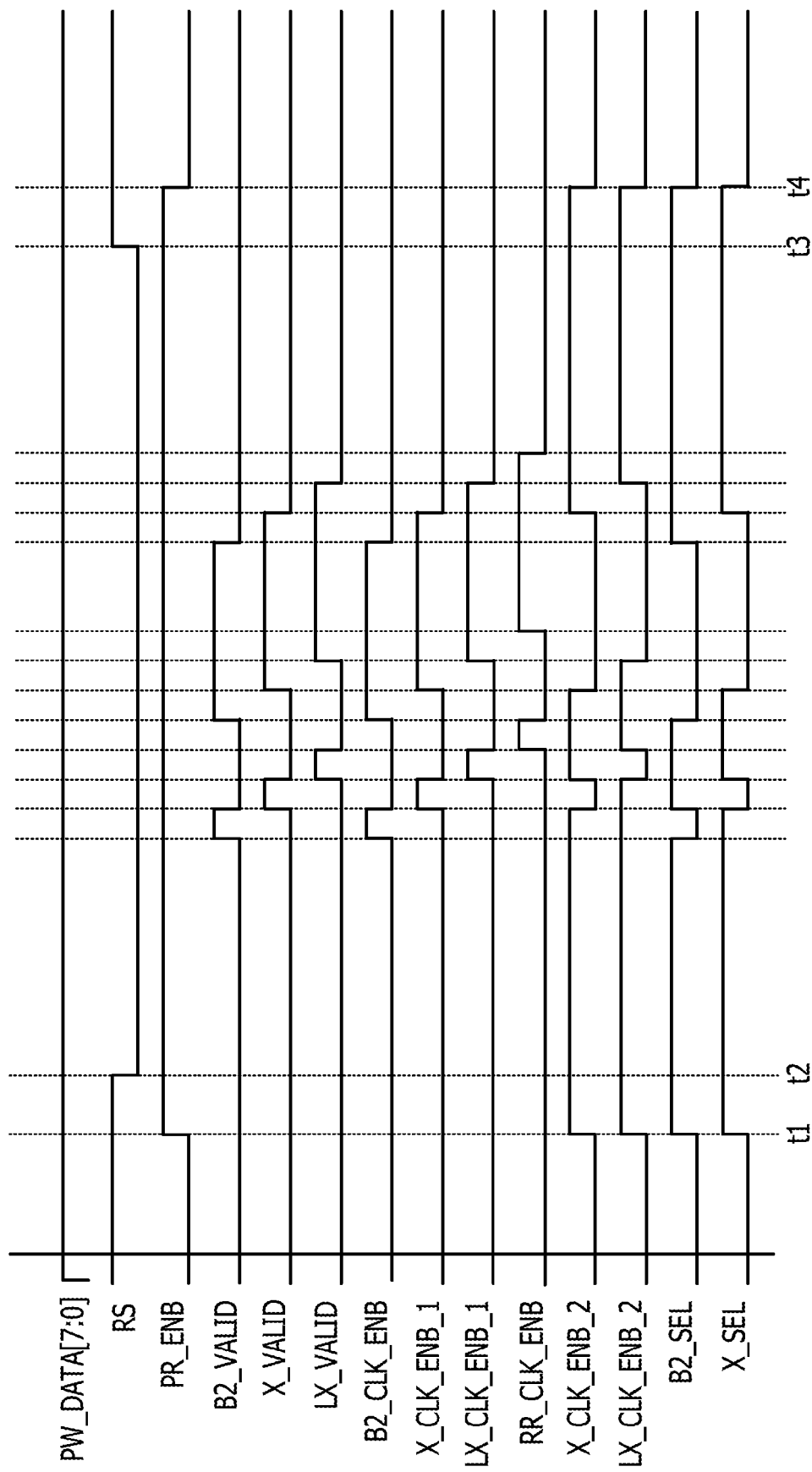
FIG. 7 is a time chart illustrating one example of a control form of an arithmetic circuit according to the embodiment.

FIG. 7 is a time chart illustrating one example of a control form of an arithmetic circuit according to the embodiment of the present disclosure. The arithmetic circuit described with reference to FIG. 7 may be the arithmetic circuit 20 illustrated in FIG. 3. When the arithmetic circuit 20 is in the stopped state (retention state), the control signal [RS] is set to "1." In this state, if the main control circuit 10 detects that an command sequence is in the specific state that possibly causes power supply noise, the main control circuit 10 makes a transition of the control signal [PR_ENB] to "1" (clock time t1). In response to this, the sub control circuit 21 causes the clock enable signals [X_CLK_ENB_2] and [LX_CLK_ENB_2] and the selection signals [B2_SEL] and [X_SEL] to make a transition to "1." The current raising operation is thereby started in the arithmetic circuit 20. At the time of the current raising operation, the arithmetic unit 22 executes an arithmetic operation regarding the dummy data [B2_DATA] or [X_DATA].

At a clock time t2, when the main control circuit 10 makes a transition of the control signal [RS] to "0," the arithmetic circuit 20 is shifted to the running state. While the arithmetic circuit 20 is in the running state, when [B2_VALID], [X_VALID], and [LX_VALID] become "1," the clock enable signals [X_CLK_ENB_2] and [LX_CLK_ENB_2] and the selection signals [B2_SEL] and [X_SEL] become "0." For example, if the arithmetic circuit 20 executes an arithmetic command, the current raising operation is stopped and the arithmetic unit 22 carries out an arithmetic operation based on the arithmetic command. On the other hand, if the arithmetic circuit 20 does not execute an arithmetic command and the control signal [PR_ENB] is set to "1," the current raising operation is executed in the arithmetic circuit 20. At the time of the current raising operation, the arithmetic unit 22 executes an arithmetic operation regarding the dummy data [B2_DATA] or [X_DATA].

At a clock time t3, when the main control circuit 10 makes a transition of the control signal [RS] to "1," the arithmetic circuit 20 is shifted to the stopped state (retention state).

Thereafter, if the command sequence becomes a state that is not the specific state that possibly causes power supply noise, the main control circuit 10 makes a transition of the control signal [PR_ENB] to "0" (clock time t4). Due to this, the clock enable signals [X_CLK_ENB_2] and [LX_CLK_ENB_2] and the selection signals [B2_SEL] and [X_SEL] become "0," so that the current raising operation is stopped in the arithmetic circuit 20.

Figure 8:
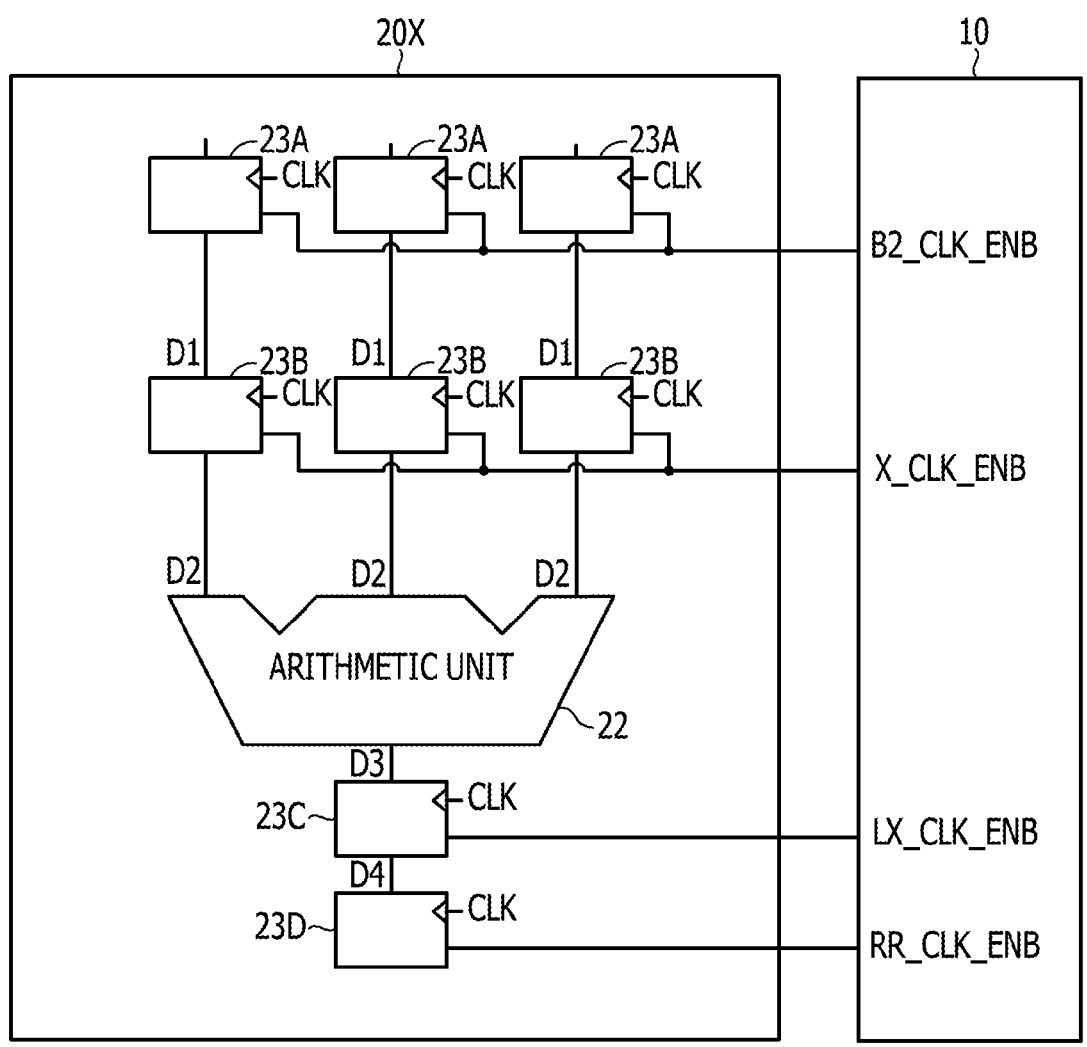
FIG. 8 is a circuit block diagram illustrating a configuration of an arithmetic circuit according to a comparative example.

FIG. 8 is a circuit block diagram illustrating a configuration of an arithmetic circuit according to a comparative example. An arithmetic circuit 20X according to the comparative example illustrated in FIG. 8 does not include the sub control circuit 21, the selectors 24A and 24B, and the OR gates 25A and 25B, which are possessed by the arithmetic circuit 20 (see FIG. 4) according to the embodiment of the present disclosure.

Figure 9:
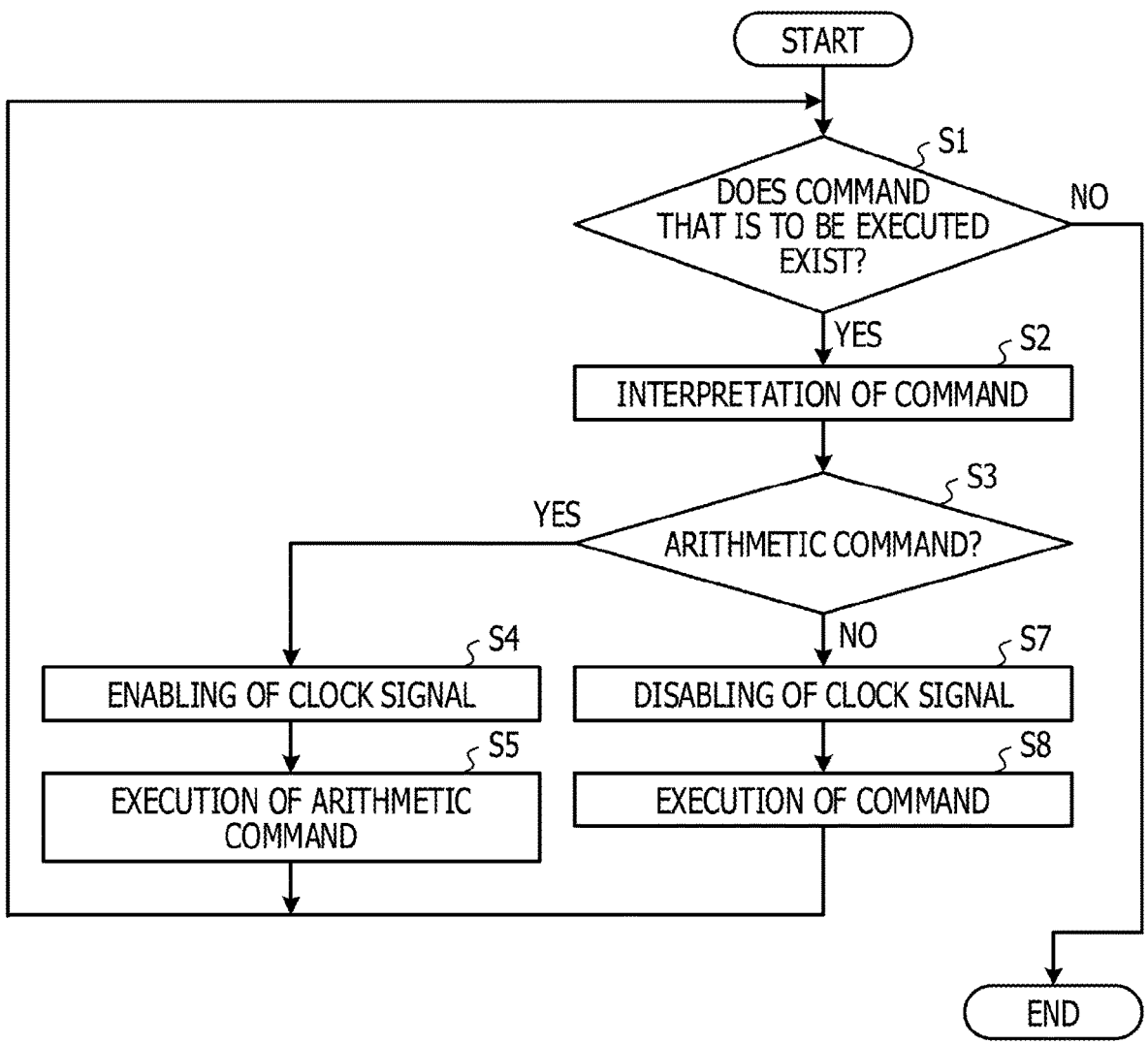
FIG. 9 is a flowchart illustrating one example of a control form of an arithmetic circuit according to the comparative example.

FIG. 9 is a flowchart illustrating one example of a control form of the arithmetic circuit 20X according to the comparative example. In this example, the respective processings executed in the steps S6 and S9 to S16 in the flowchart (FIG. 6) according to the embodiment of the present disclosure are omitted. For example, according to the control form in accordance with this comparative example, the respective clock signals CLK of the holding circuits 23A to 23D are enabled if an arithmetic command exists, and the clock signals CLK of the holding circuits 23A to 23D are disabled if an arithmetic command does not exist. According to this aspect, the difference between the magnitude of the circuit current in the ground state of the arithmetic circuit 20X and the magnitude of the circuit current in the peak state becomes large and the power supply noise becomes large.

Figure 10:
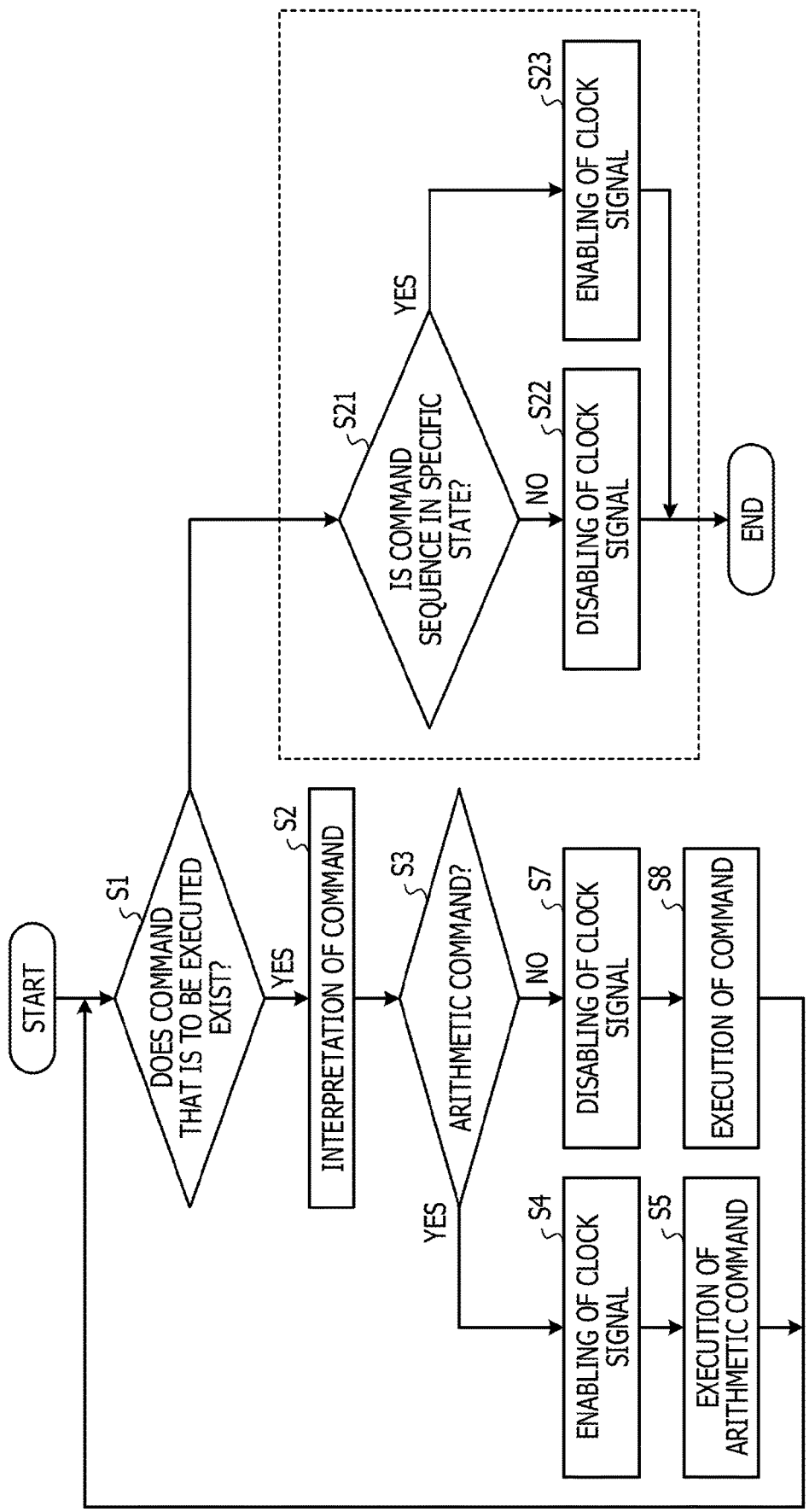
FIG. 10 is a flowchart illustrating another example of the control form of the arithmetic circuit according to the comparative example.

FIG. 10 is a flowchart illustrating another example of the control form of the arithmetic circuit 20X according to the comparative example. In this example, steps S21 to S23 are added to the flowchart illustrated in FIG. 9. For example, according to the control form in accordance with this comparative example, if a command that is to be executed does not exist, it is determined whether or not the command sequence is in the specific state that possibly causes power supply noise in the step S21. If it is determined that the command sequence is not in the specific state that possibly causes power supply noise, the respective clock signals CLK of the holding circuits 23A to 23D are disabled in the step S22. On the other hand, if it is determined that the command sequence is in the specific state that possibly causes power supply noise, the respective clock signals CLK of the holding circuits 23A to 23D are enabled in the step S23. According to the control form in accordance with this comparative example, if a command that is to be executed does not exist and power supply noise possibly occurs, disabling of the clock signal by a clock gating technique for implementing power saving control is released and the circuit current increases due to this. However, it is difficult to acquire a sufficient current amount with only the amount of current increase due to the release of disabling of the clock signal in some cases, and it is difficult to suppress the power supply noise to the allowable range in some cases.

Figure 11:
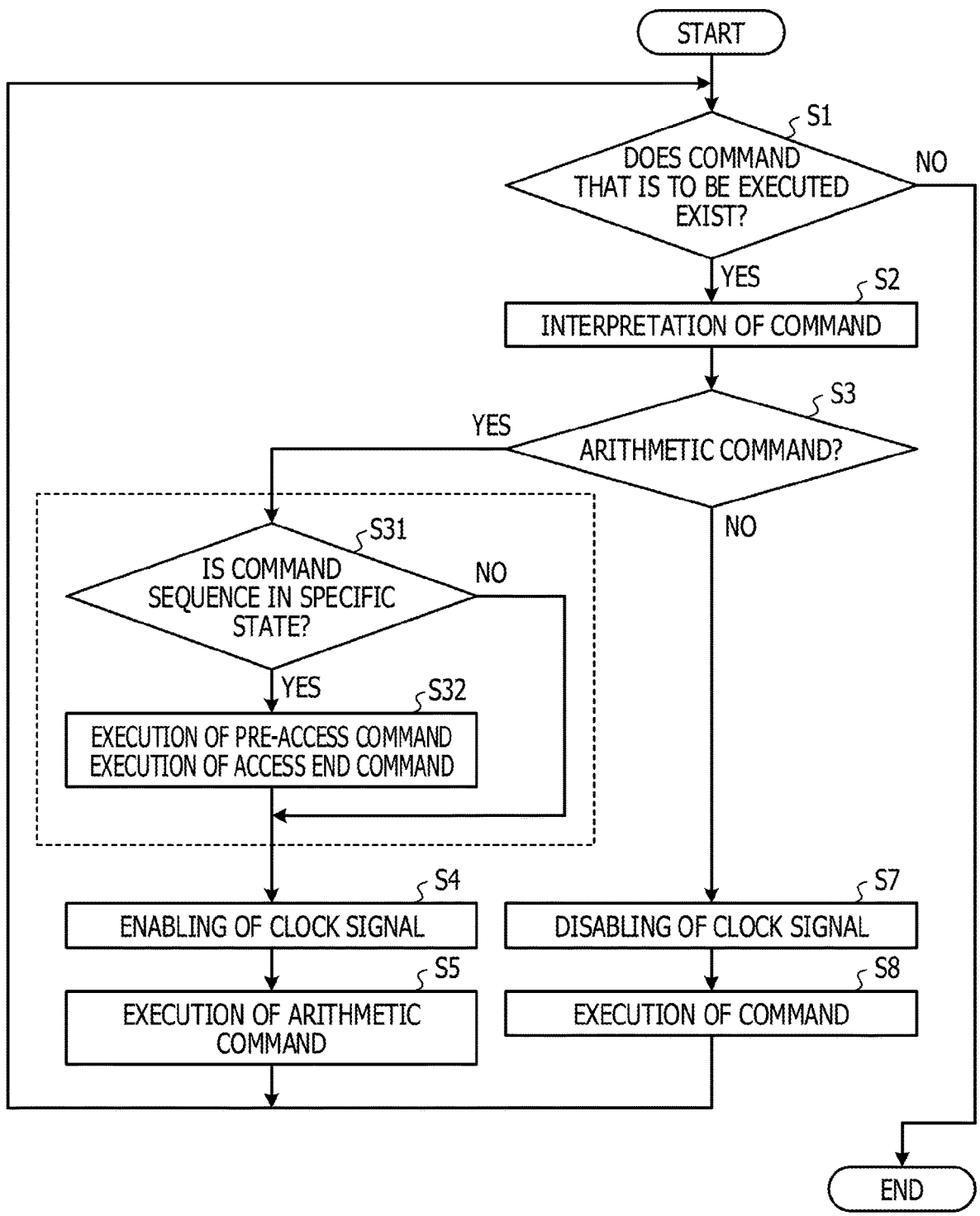
FIG. 11 is a flowchart illustrating another example of the control form of the arithmetic circuit according to the comparative example.

FIG. 11 is a flowchart illustrating another example of the control form of the arithmetic circuit 20X according to the comparative example. In this example, steps S31 and S32 are added to the flowchart illustrated in FIG. 9. For example, according to the control form in accordance with this comparative example, if an arithmetic command exists, it is determined whether or not the command sequence is in the specific state that possibly causes power supply noise in the step S31. If it is determined that the command sequence is in the specific state that possibly causes power supply noise, pre-access command and access end command are executed in the step S32. The pre-access command is a command to cause part of circuit resources to execute dummy operation to thereby disable power saving control for the circuit resources in a stepwise manner. The access end command is a command to enable power saving control for circuit resources in a stepwise manner. According to the control form in accordance with this comparative example, the circuit current increases by the pre-access command. However, the magnitude of the circuit current depends on data input to the arithmetic unit 22 at the time and it is difficult to suppress the power supply noise to the allowable range in some cases.

On the other hand, according to the control form of the arithmetic circuit 20 in accordance with the embodiment of the present disclosure, if power supply noise possibly occurs, the arithmetic unit 22 that does not execute the original arithmetic operation based on an arithmetic command executes an arithmetic operation by using the dummy data [B2_DATA] or [X_DATA]. By using the dummy data [B2_DATA] or [X_DATA] for raising of the circuit current, it becomes possible to cause the arithmetic unit 22 to repeatedly execute an arithmetic operation through which the value of each bit of the data D3, which is the arithmetic result of the arithmetic unit 22, is inverted from "0" to "1" or from "1" to "0," for example. This may effectively raise the circuit current. Furthermore, it is also possible to adjust the amount of raising of the circuit current by appropriately selecting the data patterns configuring the pieces of dummy data [B2_DATA] and [X_DATA]. Therefore, according to the processor 1 in accordance with the embodiment of the present disclosure, it becomes possible to effectively suppress power supply noise in association with variation in the circuit current.

Second Embodiment

FIG. 12 is a time chart illustrating one example of a control form of an arithmetic circuit according to a second embodiment of the present disclosure. The arithmetic circuit described with reference to FIG. 12 may be the arithmetic circuit 20 illustrated in FIG. 3. In the present embodiment, the main control circuit 10 supplies eight control signals [PW_DATA[0]] to [PW_DATA[7]] corresponding to each of the eight arithmetic circuits 20 included in the core 100 to the corresponding arithmetic circuits 20 individually.

The main control circuit 10 causes the control signals [PW_DATA[0]] to [PW_DATA[7]] to make a transition from "0" to "1" in a stepwise manner in accordance with the timing when a transition of the control signal [RS] from "1" to "0" is made (timing when the arithmetic circuit 20 makes a transition from the stopped state (retention state) to the running state, for example). Due to this, when each arithmetic circuit 20 makes a transition from the stopped state (retention state) to the running state, the current raising operation is executed in a stepwise manner in each arithmetic circuit 20.

Furthermore, the main control circuit 10 causes the control signals [PW_DATA[0]] to [PW_DATA[7]] to make a transition from "1" to "0" in a stepwise manner in accordance with the timing when a transition of the control signal [RS] from "0" to "1" is made (timing when the arithmetic circuit 20 makes a transition from the running state to the stopped state (retention state), for example). Due to this, when each arithmetic circuit 20 makes a transition from the running state to the stopped state (retention state)), the current raising operation is released in a stepwise manner in each arithmetic circuit 20.

For example, when a transition between the running state and the stopped state occurs in units of core as in switching of single instruction multiple data (SIMD) operation, possibly power supply noise occurs if execution and release of the current raising operation are carried out collectively for the plural arithmetic circuits 20 configuring the core 100. According to the control form of the arithmetic circuit 20 in accordance with the second embodiment of the present disclosure, the transition of the control signals [PW_DATA [0]] to [PW_DATA[7]] is made in a stepwise manner. Thus, it becomes possible to carry out execution and release of the current raising operation in a stepwise manner for the plural arithmetic circuits 20 configuring the core 100. Therefore, it becomes possible to suppress the occurrence of power supply noise even when a transition between the running state and the stopped state occurs in units of core as in switching of SIMD operation.

The core 100 is one example of the semiconductor device in the present disclosure. The arithmetic unit 22 is one example of the arithmetic unit in the present disclosure. The main control circuit 10 and the sub control circuit 21 are one example of the control unit in the present disclosure. The pieces of data D1 and D2 are one example of the first data in the present disclosure. The pieces of dummy data [B2_DATA] and [X_DATA] are one example of the second data in the present disclosure. The selectors 24A and 24B are one example of the selecting unit in the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
a plurality of arithmetic circuits each including a sub arithmetic circuit and configured to execute a first arithmetic operation of a specific kind regarding input data; and
a control circuit causing one of the plurality of arithmetic circuits configured to:
determine whether an arithmetic command of the first arithmetic operation of the specific kind is included in a command sequence which is supplied by interpreting the arithmetic command;
cause the sub arithmetic circuit of the one of the plurality of arithmetic circuits to execute the first arithmetic operation regarding first data that is an arithmetic operation target of the arithmetic command when interpreting that the arithmetic command of the first arithmetic operation is included in the command sequence;
determine whether the command sequence is in a specific state indicating a possibility that the plurality of arithmetic circuits make a transition from a stopped state to a running state or from the running state to the stopped state when interpreting that the arithmetic command of the first arithmetic operation is not included in the command sequence; and
execute another operation command included in the command sequence and cause the sub arithmetic circuit of the one of the plurality of arithmetic circuits to execute a second arithmetic operation regarding second data different from the first data when determining that the command sequence is in the specific state.

2. The semiconductor device according to claim 1, further comprising a selecting circuit configured to select either one of the first data and the second data and supply the selected data to the sub arithmetic circuit.

3. The semiconductor device according to claim 1, wherein the second data includes a plurality of data patterns different from each other, and the control circuit sequentially supplies the plurality of data patterns to the sub arithmetic circuit.

4. The semiconductor device according to claim 3, wherein a value of at least one bit of output bits of the sub arithmetic circuit is inverted in the plurality of data patterns.

5. The semiconductor device according to claim 1, wherein the control circuit carries out control to cause the second arithmetic operation to be executed regarding the second data for the plurality of arithmetic circuits in a stepwise manner.

6. The semiconductor device according to claim 2, wherein the control circuit includes a first control circuit configured to output a control signal indicating that the command sequence is in the specific state, and a second control circuit configured to supply, to the selecting circuit, a selection signal indicating that the second data is to be selected in the first data and the second data based on the control signal.

7. A control method of a semiconductor device comprising:
executing a first arithmetic operation of a specific kind regarding input data by each of a plurality of arithmetic circuits each including a sub arithmetic circuit and possessed by the semiconductor device;
determining, by a control circuit possessed by the semiconductor device, whether an arithmetic command of the first arithmetic operation of the specific kind is included in a command sequence which is supplied by interpreting the arithmetic command;
causing the sub arithmetic circuit of the one of the plurality of arithmetic circuits to execute the first arithmetic operation regarding first data that is an arithmetic operation target of the arithmetic command by the control circuit when interpreting that the arithmetic command of the first arithmetic operation is included in the command sequence;
determining whether the command sequence is in a specific state indicating a possibility that the plurality of arithmetic circuits collectively make a transition from a stopped state to a running state or from the running state to the stopped state when interpreting that the arithmetic command of the first arithmetic operation is not included in the command sequence; and
executing another operation command included in the command sequence and causing the sub arithmetic circuit of the one of the plurality of arithmetic circuits to execute a second arithmetic operation regarding second data different from the first data by the control circuit when determining that the command sequence is in the specific state.

8. The control method according to claim 7, further comprising selecting either one of the first data and the second data and supplying the selected data to the sub arithmetic circuit by a selecting circuit possessed by the semiconductor device.

9. The control method according to claim 7, wherein the second data includes a plurality of data patterns different from each other, and the control circuit sequentially supplies the plurality of data patterns to the sub arithmetic circuit.

10. The control method according to claim 9, wherein a value of at least one bit of output bits of the sub arithmetic circuit is inverted in the plurality of data patterns.

11. The control method according to claim 7, wherein the control circuit carries out control to cause the second arithmetic operation to be executed regarding the second data for the plurality of arithmetic circuits in a stepwise manner.

\* \* \* \* \*